US007243348B2

(12) United States Patent
Good et al.

(10) Patent No.: US 7,243,348 B2
(45) Date of Patent: Jul. 10, 2007

(54) COMPUTING APPARATUS WITH AUTOMATIC INTEGRITY REFERENCE GENERATION AND MAINTENANCE

(75) Inventors: Thomas E. Good, Portland, OR (US); Robert A. DiFalco, Portland, OR (US); Gene Ho Kim, Portland, OR (US)

(73) Assignee: Tripwire, Inc., Portland, OR (US)

( * ) Notice: Subject to any disclaimer, the term of this patent is extended or adjusted under 35 U.S.C. 154(b) by 184 days.

(21) Appl. No.: 10/251,317

(22) Filed: Sep. 19, 2002

(65) Prior Publication Data
US 2004/0060046 A1    Mar. 25, 2004

(51) Int. Cl.
G06F 9/445 (2006.01)
G06F 11/30 (2006.01)

(52) U.S. Cl. ........................ 717/174; 713/187

(58) Field of Classification Search ................ 717/116, 717/120, 124–127, 168–178; 713/187, 191; 713/200; 714/36, 38; 711/6; 707/202–204
See application file for complete search history.

(56) References Cited

U.S. PATENT DOCUMENTS

| | | | |
|---|---|---|---|
| 5,359,728 A | | 10/1994 | Rusnack et al. |
| 5,421,006 A | * | 5/1995 | Jablon et al. .................. 714/36 |
| 5,537,540 A | * | 7/1996 | Miller et al. .................. 714/38 |
| 5,944,821 A | * | 8/1999 | Angelo ........................ 713/200 |
| 5,991,774 A | * | 11/1999 | Tate et al. .................... 707/203 |
| 6,023,586 A | * | 2/2000 | Gaisford et al. .............. 717/178 |
| 6,035,295 A | | 3/2000 | Klein |
| 6,349,355 B1 | * | 2/2002 | Draves et al. .................. 711/6 |
| 6,360,366 B1 | * | 3/2002 | Heath et al. .................. 717/178 |
| 6,598,060 B2 | * | 7/2003 | Goldick ....................... 707/203 |
| 6,640,317 B1 | * | 10/2003 | Snow .......................... 714/38 |
| 2003/0023856 A1 | * | 1/2003 | Horne et al. ................. 713/187 |
| 2004/0015847 A1 | * | 1/2004 | Berg et al. ................... 717/116 |

OTHER PUBLICATIONS

Gene H. Kim and Eugene H. Spafford, "The Design and Implementation of Tripwire: A File System Integrity Checker", 1994, ACM Press, SIGSAC : ACM Special Interest Group on Security, Audit, and Control, pp. 18-29.*
Microsoft Knowledge Base Article, "How the System File Checker Baseline Is Determined", Microsoft, Aug. 5, 2000.*
"Maintaining your Computer—Tips & Tricks", Microsoft, Apr. 21, 1999.*

* cited by examiner

Primary Examiner—Meng-Al T. An
Assistant Examiner—Trenton J. Roche
(74) Attorney, Agent, or Firm—Schwabe Williamson & Wyatt

(57) ABSTRACT

An apparatus is equipped to automatically update one or more integrity references of a software entity, when the software entity is installed onto the apparatus. The apparatus is further equipped to periodically determine whether the integrity of the apparatus has been compromised based at least in part on the one or more integrity references of the software entity that are automatically updated during installation of the software entity.

22 Claims, 7 Drawing Sheets

COMPUTING APPARATUS WITH AUTOMATIC INTEGRITY REFERENCE GENERATION AND MAINTENANCE

FIELD OF THE INVENTION

The present invention relates to the field of computing. More specifically, the present invention is related to trusted computing.

BACKGROUND OF THE INVENTION

With the proliferation of networked devices such as computers, digital assistants, wireless phones and so forth, and the ubiquitous access afforded to these devices by local, regional and wide area networks, such as the Internet, even the most protected executables and data can be vulnerable to harm. Whether the harm is due to damage caused by a virus, an unauthorized access, or simply due to natural occurrences such as exposure to the elements, the importance of executable and data integrity and security cannot be overstated.

Unfortunately, under the prior art, integrity and security issues have been pretty much treated as post-installation issues. That is, denial of unauthorized accesses, protection of executable and data integrity, and so forth have been addressed with protocols, utilities and tools that are decoupled from the installation process.

FIG. 1 illustrates a typical prior art installation process for installing software products or entities onto a computing apparatus. The terms "product" and "entity" as used herein are substantively synonymous to convey the fact that for the purpose of the application, the object of an install may be of a wide range of "entities". These "entities" may include, but are not limited to, simple "entities", each having only a handful of parts and generally not referred to as a "product" whether they have commercial values or not, as well as complex "entities", each having a large number of parts and generally refers to as a "product", as it typically has commercial value.

As illustrated, typically, a software product/entity 102 having a number of components 110, has one or more associated description and installation instruction files 104. Collectively, the associated description and installation instruction files 104 include e.g. the feature list of the software product/entity 102, the part list 114, the association between features and parts 116, and instructions on how and/or where to store the parts 118. Further, if applicable, the associated description and installation instruction files 104 may also include customization instructions 120, compilation instructions 122, linking instructions 124 and access set up instructions 126.

Generally, both components 110 and features are made up of parts. Components 110 are collections of parts viewed from a structure perspective of the product/entity 102, whereas features are collections of parts viewed from an external user perspective. As used herein, the terms are not necessarily meant to be mutually exclusive. The precise definition and delineation of these terms are not essential to the understanding or practice of the present invention. Accordingly, they are not to be read restrictively.

Continuing to refer to FIG. 1, typically an installer 100 reads 128 the product description and installation instruction file(s) 112, then installs the product/entity 102 based substantially on the description and installation instructions provided. Typically, the installation results in the components 110 of product/entity 102, made up of executables 144 and associated resources 146, being stored into a file system 106 in a manner that allows executables 144 to be retrievable for execution. Various product/entity related information 148, such as the installed parts, their usage of shared functions, and so forth, may be stored in a system repository 108.

In addition to reading the product/entity description and install instructions 104, installer 100 typically reads 202 product/entity file 102 to obtain the parts, and stores 132 the obtained parts as instructed. Upon storing the parts, installer 100 typically solicits 134 customization inputs from a user, then compiles 136 and links 138 the product together per the instructions provided and the customization inputs received. Further, for products/entities 102 designed for interactive usage, typically, the installation process may also include setting up the user access mechanism, e.g. "start up" icons and so forth.

Accordingly, it is desirable if the installation process can be enhanced to contribute to the safe guarding of the integrity of a computing apparatus, or simply, a programmable apparatus.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes a method and apparatus for facilitating interaction between software entities, through the employment of an abstraction interface of a control type.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Terminology

Parts of the description will be presented in data processing terms, such as data, selection, retrieval, generation, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Part of the descriptions will employ various abbreviations, including but are not limited to:

| | |
|---|---|
| MD5 | Message Digest |
| SHA-1 | Secure HASH Algorithm |

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Overview

Figure 1:
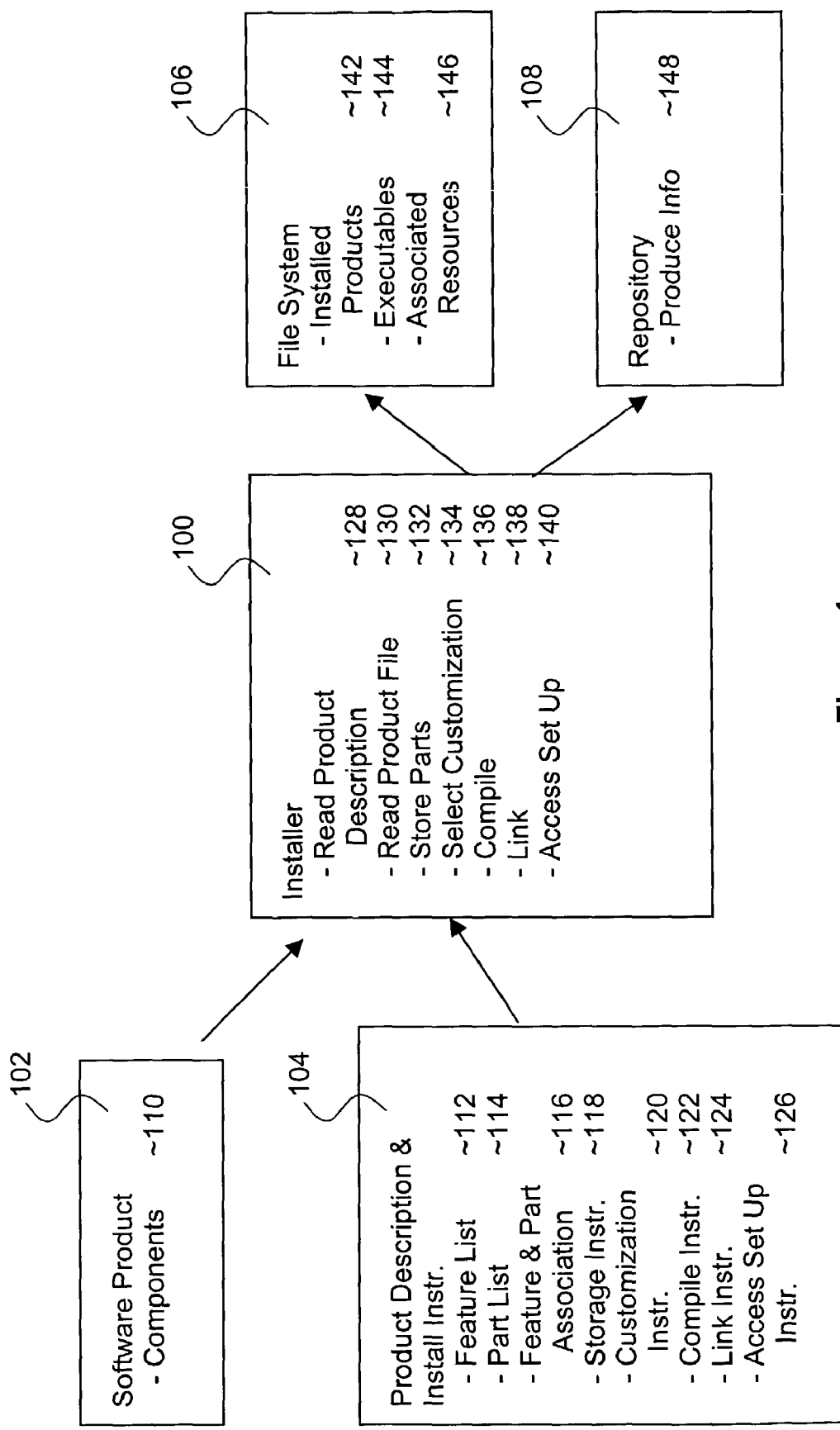
FIG. 1 illustrates an example installation process of the prior art.
Figure 2:
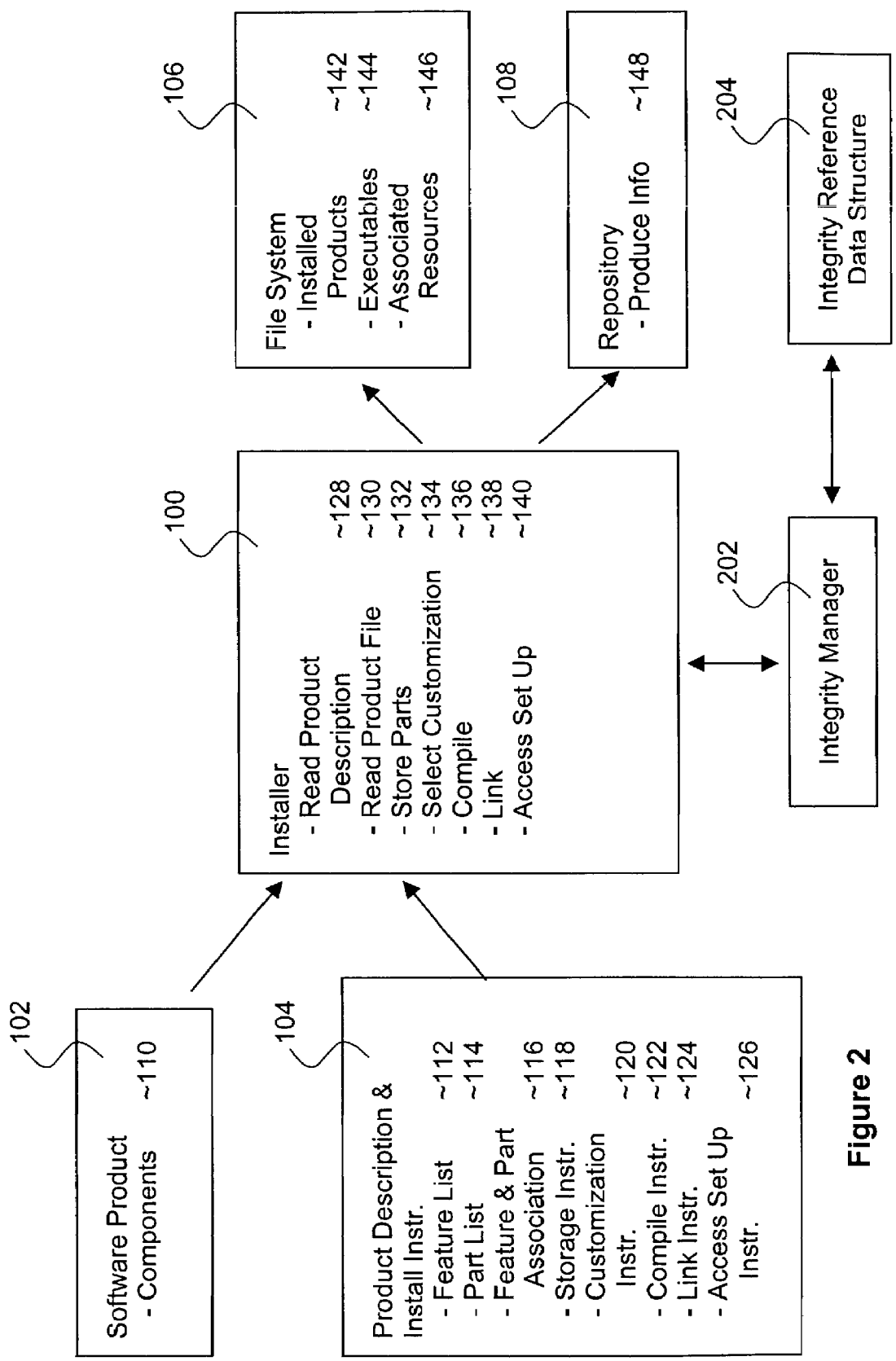
FIG. 2 illustrates another example installation process, incorporated with the teachings of the present invention.

FIG. 2 illustrates an overview of the present invention, in accordance with one embodiment, in the context of the example installation process of FIG. 1 enhanced with the teachings of the present invention. As illustrated, in accordance with the present invention, installation manager 202 is provided to complement installer 100.

Briefly, integrity manager 202 is equipped to assist installer 100 in associating each part of a software product/entity 102 installed onto the host computing apparatus with an integrity family and an integrity measure, as part of the installation process, and store the information in integrity reference data structure 204. Further, integrity manager 202 is equipped to perform periodic post-installation integrity check on the host computing apparatus, using at least the information stored in the integrity reference data structure 204.

Thus, integrity manager 202 may readily detect and report malicious compromise of the computing apparatus, especially if all installation of software products/entities onto the host computing apparatus are performed through installer 100.

The term "host computing apparatus" refers to the computing apparatus on which integrity manager 202 executes at least in part, to verify the integrity of its "relevant" components. Typically, integrity manager 202 executes in whole in the "host computing apparatus". However, the present invention contemplates that, in alternate embodiments, portions of the verification process, e.g. part of the computation of a signature, may be performed on another companion/supporting computing device. Moreover, the "computing" apparatus may be just any programmable apparatus.

Typically, what constitutes "compromised" is component dependent. For example, for an executable, it may be the signature of the executable no longer matching a known "good" signature, whereas for certain critical system data, it may be the current value not matching a known "good" value or within a range of known "good" values.

Similarly, what constitutes "goodness" may be application dependent, i.e., varies from one application of the present invention to another.

Data Organization

Figure 3:
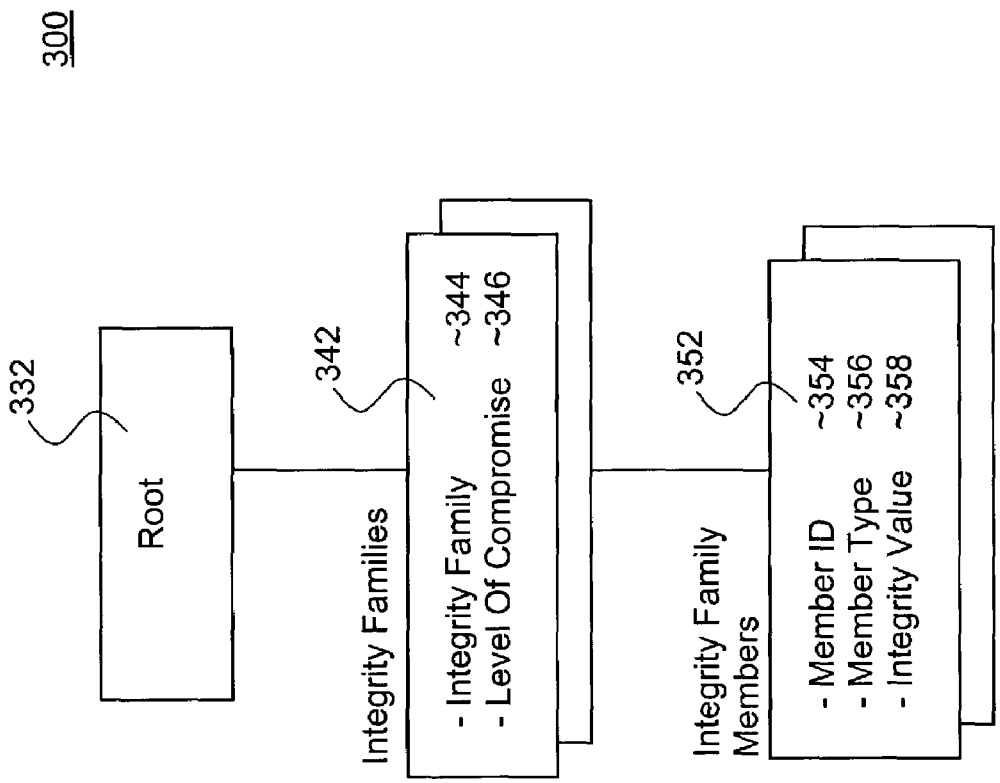
FIG. 3 illustrates the integrity reference data structure of FIG. 2 in further details, in accordance with one embodiment.

FIG. 3 illustrate associated data structure 204 in further details, in accordance with one embodiment. For the embodiment, data structure 204 includes a root object 332 having a number of children Integrity Family objects 344, which in turn have a number of children Integrity Family Member objects 352.

Each Integrity Family object 342 includes in particular Integrity Family attribute 344, and Level of Compromise 346. Integrity Family attribute 344 is employed to identify a "family" of components, from the perspective of integrity assurance. One example for organizing components of software product/entity 102 into integrity families, for integrity assurance purpose, is organizing the components in terms of whether the components are members of the kernel of the operating system, a shared/non-shared library, whether the components have privileged access or not, and so forth. That is, the components are organized into the families of "privileged kernel components of the operating system", "other privileged components of the operating system", "non-privileged components of the operating system", "privileged and non-shared library components", "privileged and shared library components", "non-privileged and non-shared library components", "non-privileged and shared library components", and so forth.

The term "privilege" as used herein refers to the "authority" of the component in performing certain operations on the host computing apparatus, e.g. whether the component may access certain registers and/or memory locations of the host computing apparatus. Typically, the delineation between "privileged" and "non-privileged" entities is operating system dependent.

In alternate embodiments, other manners of organization may be practiced instead.

Level of Compromise 346 is employed to denote a risk level in the event a member of the integrity family fails an integrity check. The risk level enables integrity manager 202 or other security management entities to determine remedial actions, based on the risk level. For example, in one embodiment, the risk level enables the integrity manager 202 to determine whether soft fail over may still occur.

Integrity based soft fail over is the subject matter of co-pending application, entitled "Computing Environment and Apparatuses with Integrity based Fail Over", filed contemporaneously, which is hereby fully incorporated by reference (for U.S. version of the present application).

Each Integrity Family Member object 352 includes in particular Member ID attribute 354, Member Type attribute 356 and Integrity Measure attribute 358. Member ID attribute 354 is employed to specifically denote or identify a component, e.g. the name of an executable, a system data, and so forth, whereas Member Type attribute 356 is employed to denote the type of the named component, i.e. whether it is an executable, a system data, and so forth. Integrity Measure attribute 358 denotes the measure to be employed to determine whether the integrity family member is to be considered compromised or not, e.g. a signature of an executable or a system data value. Signatures may be in the form of MD5, SHA-1, or other hashing values of like kind.

In alternate embodiments, other data organizations may be employed instead.

Integrity Manager

Figure 4:
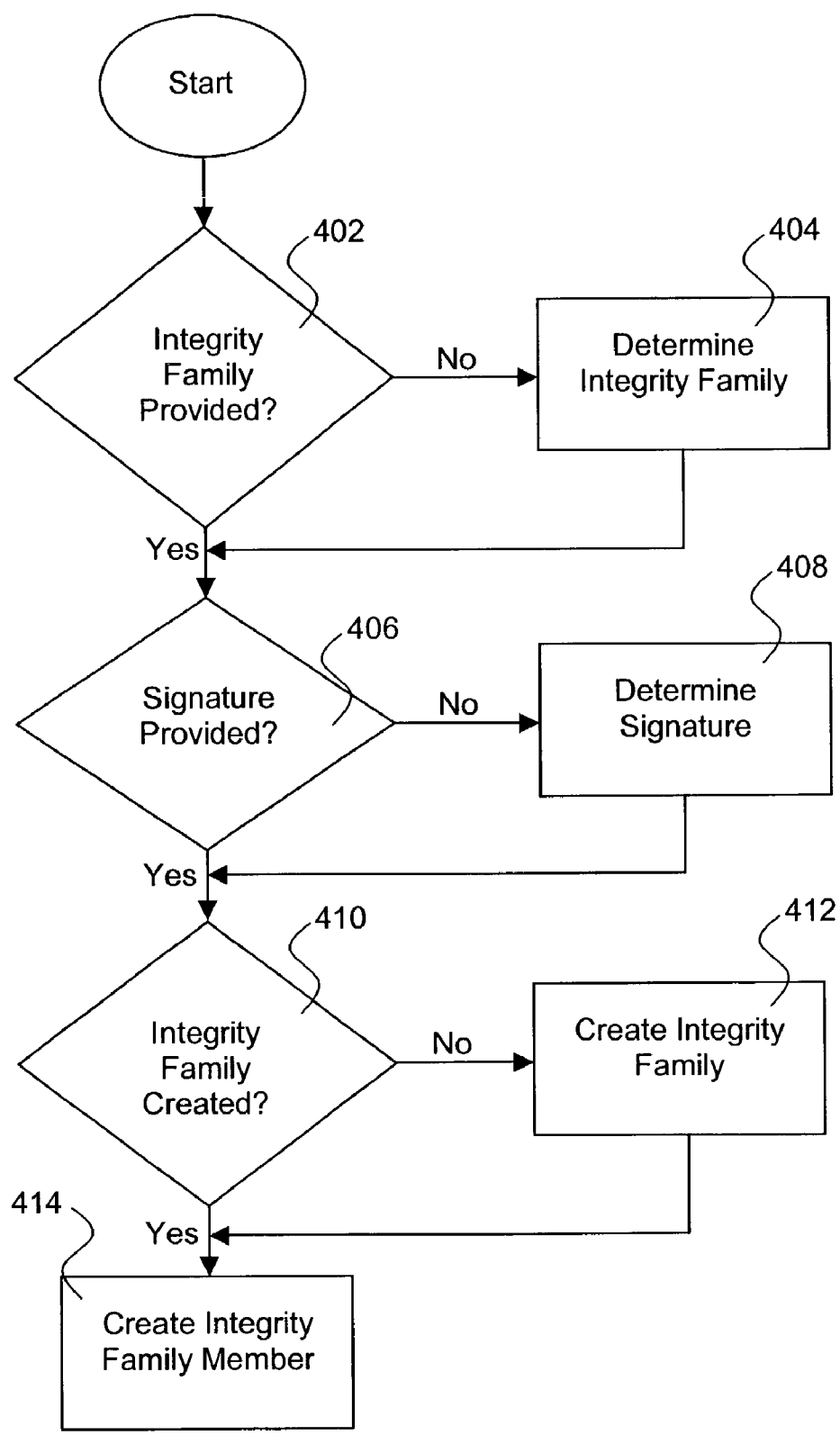
FIG. 4 illustrates the operational flow of the relevant aspects of the integrity manager of FIG. 2 for automatically updating the integrity reference data structure, in accordance with one embodiment.

FIG. 4 illustrates the operational flow of the relevant aspects of the integrity manager of FIG. 2 for associating a component/part with an integrity family and an integrity measure, in accordance with one embodiment. As illustrated, upon invoked by installer 100 to associate a component/part with an integrity family and an integrity measure, integrity manager 202 first determines if the developer of the software product/entity 102 has provided an integrity family for the component/part (e.g. via description/instructions 104), block 402.

If the developer of the software product/entity 102 has not provided an integrity family for the component/part, integrity manager 202 determines an integrity family for the component/part, e.g. based on the nature of the component/part, block 404.

Upon determining an integrity family for the component/part, integrity manager 202 determines if the developer of the software product/entity 102 has provided an integrity measure for the component/part (e.g. via description/instructions 104), block 406.

If the developer of the software product/entity 102 has not provided an integrity measure for the component/part, integrity manager 202 determines an integrity measure for the component/part, e.g. by generating a hash value such as MD5 or SHA-1, for the component/part, block 408.

Next, integrity manager 202 determines if the corresponding integrity family object has previously been created in integrity reference data structure 204, block 410. If the corresponding integrity family object has not been previously created, integrity manager 202 creates the integrity family object 342 in integrity reference data structure 204, block 412.

Then, upon either determining that the corresponding integrity family object 342 has previously been created, or creating corresponding integrity family object 342, the integrity manager 202 creates the integrity family member objects 352, block 414.

Figure 5A:
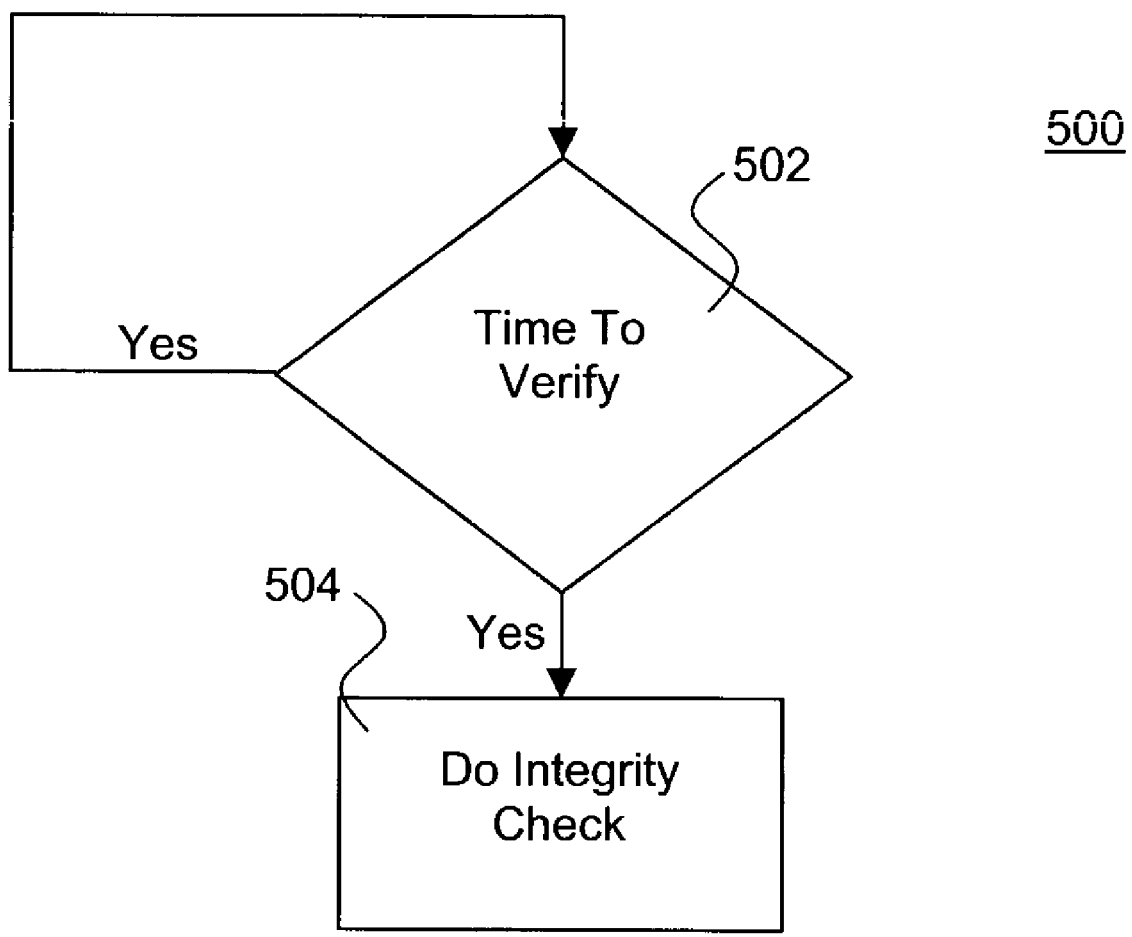
FIG. 5 illustrates the operational flow of the relevant aspects of the integrity manager of FIG. 2 for performing periodic post-installation integrity check, in accordance with one embodiment.
Figure 5B:
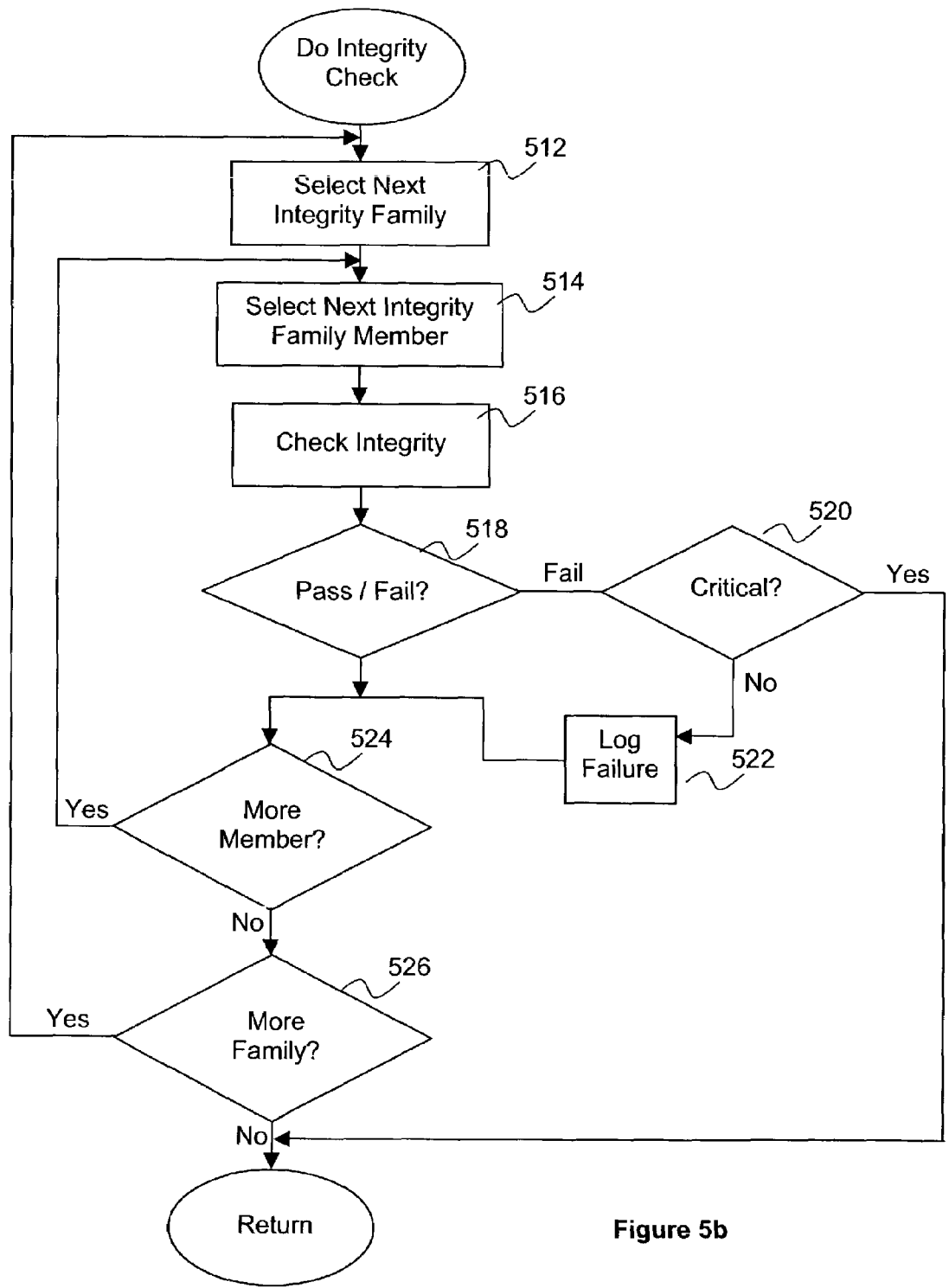

FIGS. 5a-5b illustrate the operational flow of the relevant aspects of the integrity manager of FIG. 2 for periodically performing integrity check on the computing apparatus, in accordance with one embodiment. As illustrated, in invocation, e.g. after initialization of the host computing apparatus, integrity manager 202 determines if it is time to perform an integrity check on the host computing apparatus, block 502. If not, integrity manager 202 waits for the time to perform the integrity check. If it is time, integrity manager 202 proceeds to perform the integrity check on the host computing apparatus, block 504.

In alternate embodiments, integrity manager 202 may perform the integrity check continuously. That is, integrity manager 202 may perform an integrity check on the host computing apparatus, as soon as an integrity check is finished, without waiting.

FIG. 5b illustrates the operational flow of the relevant part of integrity manager 202 for performing an integrity check, in accordance with one embodiment. As illustrated, integrity manager 202 first selects an integrity family to start verifying its component, e.g. the privileged kernel of the operating system, block 512. Upon selecting an integrity family, integrity manager 202 selects a member of the integrity family, block 514. The selection may be made using the earlier described data and function organization 204.

Upon selecting an integrity family member, integrity manager 202 verifies its integrity, block 516. The action may include verifying the state of an executable component conforms to an expected signature, e.g. MD5 or SHA-1, or the state of a system data conforms to an expected value, and so forth.

At block 518, integrity manager 202 determines if the component/data passes the verification check or not. If integrity manager 202 determines the component/data fails the verification check, it further determines if the failure is to be considered critical. The determination e.g. may be based on the severity of comprise associated with the component/data's integrity family, block 520.

If the failure is to be deemed as a critical failure, integrity manager 202 immediately terminates the verification process, and initiates a remedial operation, which is application dependent. An example of an appropriate remedial operation may include causing the host computing apparatus to shut down.

If the failure is not deemed to be a critical failure, integrity manager 130 may merely log the non-critical integrity failure, block 522, and continues at block 524.

Back at block 518, if integrity manager 202 determines the component/data passes the integrity verification, it also continues at block 524.

At block 524, integrity manager 202 determines whether there are additional members of the selected integrity family remain to be verified. If so, integrity manager 202 returns to block 514, and continues from there as earlier described.

If all members of the selected integrity family have been verified, integrity manager 202 continues at block 526, and determines whether there are additional integrity families remain to be verified. If so, integrity manager 202 returns to block 512, and continues from there as earlier described.

If all integrity families have been verified, the integrity verification is completed.

Example Computer System

Figure 6:
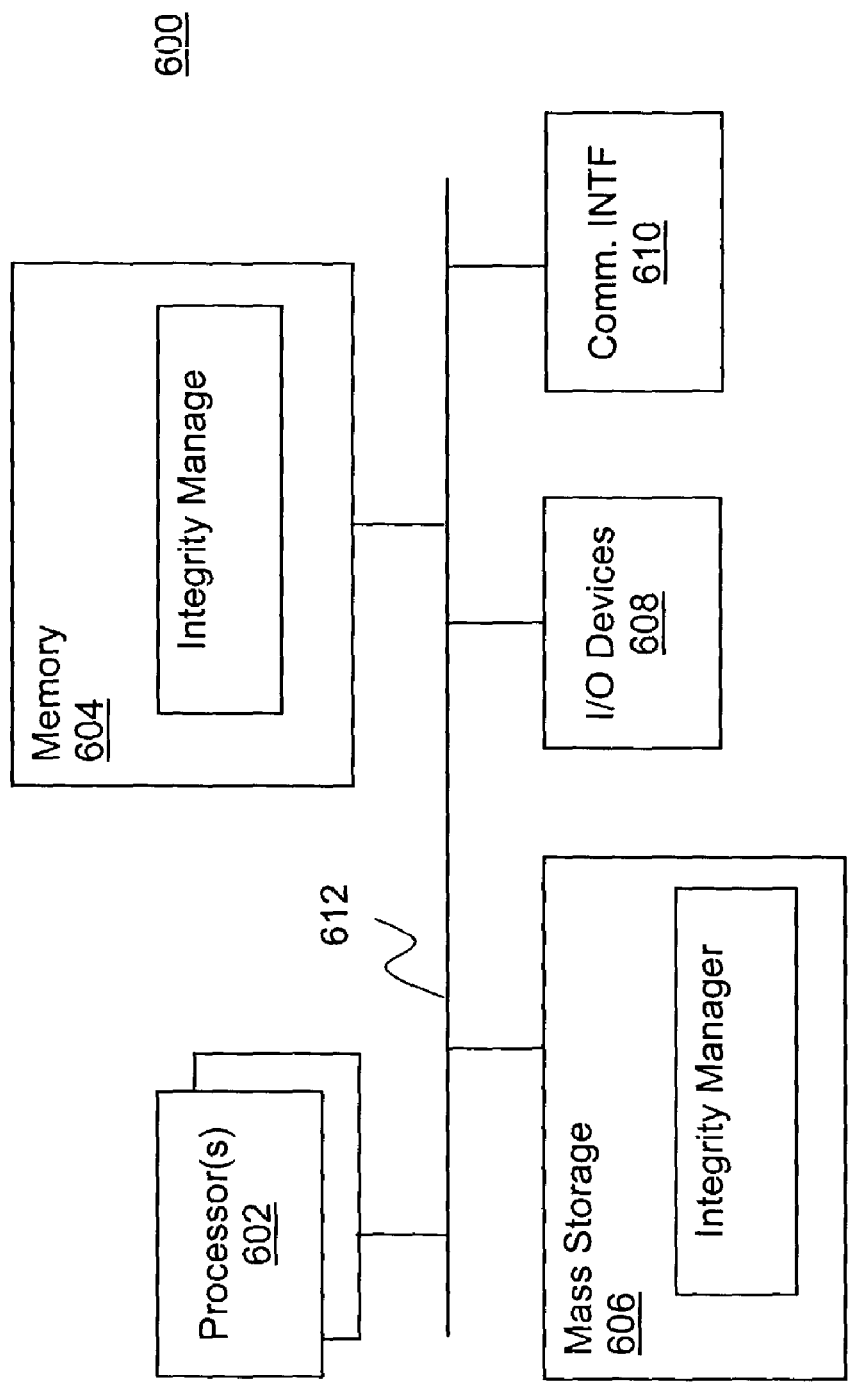
FIG. 6 illustrates an example computer system suitable for use to practice the present invention, in accordance with one embodiment.

FIG. 6 illustrates an example computer system suitable for use to practice the present invention as a host of computing apparatus, in accordance with one embodiment. As shown, computer system 600 includes one or more processors 602, and system memory 604. Additionally, computer system 600 includes mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown).

Each of these elements performs its conventional functions known in the art. In particular, system memory 604 and mass storage 606 are employed to store a working copy and a permanent copy of the programming instructions implementing integrity manager 202. The permanent copy of the programming instructions may be loaded into mass storage 606 in the factory, or in the field, through e.g. a distribution medium (not shown) or through communication interface 610 (from a distribution server (not shown)).

The constitution of these elements 602-612 are known, and accordingly will not be further described.

CONCLUSION AND EPILOGUE

Thus, it can be seen from the above descriptions, a novel computing apparatus with enhanced computing integrity, including automatic generation and maintenance of an integrity reference has been described.

While the present invention has been described in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A computing device implemented method, comprising:
   automatically updating one or more integrity references of a software entity during installation of the software entity onto the computing apparatus; and
   automatically periodically determining, independent of the software entity's execution, whether integrity of the computer apparatus has been compromised, based at least in part on said one or more integrity references of the software entity that are automatically updated during installation of the software entity
   wherein said automatic updating of the one or more integrity references of the software entity during installation of the software entity comprises automatically determining an integrity family for a component of the software entity during installation of the software entity;
   wherein said automatic determining of an integrity family for a component of the software entity during installation of the software entity comprises
   automatically determining during installation of the software entity, whether an integrity family is specified for the component of the software entity, and
   if an integrity family is not specified for the component of the software entity, automatically assigning an integrity family for the component of the software entity.

2. The method of claim 1, wherein said integrity family is a selected one of
   privileged kernel of an operating system,
   other privileged components of the operating system,
   non-privileged components of the operated system,
   privileged and non-shared library components,
   privileged and shared library components,
   non-privileged and non-shared library components, and
   non-privileged and shared library components.

3. The method of claim 1, wherein said automatic updating of the one or more integrity references of the software entity during installation of the software entity comprises automatically determining a signature for a component of the software entity during installation of the software installation.

4. The method of claim 3, wherein said automatic determining of a signature for a component of the software entity during installation of the software entity comprises
   automatically determining during installation of the software entity, whether a signature is provided for the component of the software entity, and
   if a signature is not specified for the component of the software entity, automatically generating a signature for the component of the software entity.

5. The method of claim 3, wherein said signature is a selected one of MD5 and SHA-1.

6. The method of claim 1, wherein said periodic determining of whether integrity of the computing apparatus has been compromised comprises continuously determining whether integrity of the computing apparatus has been compromised, based at least in part on said one or more integrity references of the software entity that are automatically updated during installation of the software entity.

7. The method of claim 1, wherein each of said periodic determining of whether integrity of the computing apparatus has been compromised comprises verifying a privileged kernel of an operating system of the computing apparatus has not been compromised, based at least in part on an integrity reference of the privileged kernel of the operating system that is automatically updated during installation of the privileged kernel of the operating system.

8. The method of claim 1, wherein each of said periodic determining of whether integrity of the computing apparatus has been compromised comprises verifying other privileged software components of the computing apparatus have not been compromised, based at least in part on integrity references of the other privileged software components that are automatically updated during installation of the other privileged software components.

9. The method of claim 1, wherein each of said periodic determining of whether integrity of the computing apparatus has been compromised comprises verifying shared non-privileged software components of the computing apparatus have not been compromised, based at least in part on integrity references of the shared non-privileged software components that are automatically updated during installation of the shared non-privileged software components.

10. The method of claim 1, wherein each of said periodic determining of whether integrity of the computing apparatus has been compromised comprises verifying non-shared and non-privileged software components of the computing apparatus have not been compromised, based at least in part on integrity references of the non-shared and non-privileged software components that are automatically updated during installation of the non-shared and non-privileged software components.

11. The method of claim 1, wherein each of said periodic determining of whether integrity of the computing apparatus has been compromised comprises verifying certain designated system data of the computing apparatus have not been compromised, based at least in part on integrity references of the designated system data that are automatically updated during installation of system software of the computing apparatus.

12. An apparatus comprising:
    a storage medium having stored therein a plurality of programming instructions designed to
    automatically update one or more integrity references of a software entity during installation of the software entity onto a computing device, and
    automatically periodically determine, independent of the software entity's execution, whether integrity of the computing device has been compromised, based at least in part on said one or more integrity references of the software entity that are automatically updated during installation of the software entity;
    wherein said programming instructions are designed to perform said automatic updating of the one or more integrity references during installation of the software entity by automatically determining an integrity family for a component of the software entity during installation of the software entity;

wherein said programming instructions are designed to perform said automatic determining of an integrity family for a component of the software entity during installation of the software entity by automatically determining during installation of the software entity, and if an integrity family is not specified for the component of the software entity, automatically assigning an integrity family for the component of the software entity; and a processor coupled to the storage medium to execute the programming instructions.

13. The apparatus of claim 12, wherein said integrity family is a selected one of privileged kernel of an operating system,
other privileged components of the operating system,
non-privileged components of the operating system,
privileged and non-shared library components,
privileged and shared library components,
non-privileged and non-shared library components, and
non-privileged and shared library components.

14. The apparatus of claim 12, wherein said programming instructions are designed to perform said automatic updating of the one or more integrity references during installation of the software entity by automatically determining a signature for a component of the software entity during installation of the software entity.

15. The apparatus of claim 14, wherein said programming instructions are designed to perform said automatic determining of a signature for a component of the software entity during installation of the software entity by automatically determining during installation of the software entity, whether a signature is provided for the component of the software entity, and if a signature is not specified for the component of the software entity, automatically generating a signature for the component of the software entity.

16. The apparatus of claim 14, wherein said signature is a selected one of MD5 and SHA-1.

17. The apparatus of claim 12, wherein said programming instructions are designed to perform said periodic determining of whether integrity of the computing device has been compromised by continuously determining whether integrity of the computing device has been compromised, based at least in part on the one or more integrity references of the software entity that are automatically updated during installation of the software entity.

18. The apparatus of claim 12, wherein said programming instructions are designed to perform each of said periodic determining of whether integrity of the computing device has been compromised by verifying a privileged kernel of an operating system of the computing device has not been compromised, based at least in part on one or more integrity references of the privileged kernel of the operating system that are automatically updated during installation of the privileged kernel of the operating system.

19. The apparatus of claim 12, wherein said programming instructions are designed to perform each of said periodic determining of whether integrity of the computing device has been compromised by verifying other privileged software components of the computing device have not been compromised, based at least in part on one or more integrity references of the other privileged software components that are automatically updated during installation of the other privileged software components.

20. The apparatus of claim 12, wherein said programming instructions are designed to perform each of said periodic determining of whether integrity of the computing device has been compromised by verifying shared non-privileged software components of the computing device have not been compromised.

21. The apparatus of claim 12, wherein said programming instructions are designed to perform each of said periodic determining of whether integrity of the computing device has been compromised by verifying non-shared and non-privileged software components of the computing device have not been compromised, based at least in part on one or more integrity references of the non-shared and non-privileged software components that are automatically updated during installation of the non-shared and non-privileged software components.

22. The apparatus of claim 12, wherein said programming instructions are designed to perform each of said periodic determining of whether integrity of the computing device has been compromised by verifying certain designated system data of the computing device have not been compromised, based at least in part on one or more integrity references of the designated system data that are automatically updated during installation of system software of the computing device.

* * * * *

UNITED STATES PATENT AND TRADEMARK OFFICE
CERTIFICATE OF CORRECTION

PATENT NO. : 7,243,348 B2 Page 1 of 1
APPLICATION NO. : 10/251317
DATED : July 10, 2007
INVENTOR(S) : Thomas E. Good et al.

It is certified that error appears in the above-identified patent and that said Letters Patent is hereby corrected as shown below:

In the Claims:

Col. 7, line 25 "...the computing apparatus; and"..." should read --...a computing apparatus; and...--;

Col. 7, line 28, "...computer apparatus..." should read --...computing apparatus...--;

Col. 7, line 51, "...the operated system,..." should read --...the operating system...--;

Col. 9, lines 5-10, "...wherein said programming...software entity, and..." should read --...wherein said programming...software entity, whether an integrity family is specified for the component of the software entity, and...--.

Signed and Sealed this

Eighteenth Day of November, 2008

JON W. DUDAS
*Director of the United States Patent and Trademark Office*